(12) United States Patent
Chemelli et al.

(10) Patent No.: US 8,460,149 B1
(45) Date of Patent: Jun. 11, 2013

(54) DIFFERENTIAL BEARING SYSTEM FOR A POWER TRANSMITTING COMPONENT AND METHOD FOR ASSEMBLING A POWER TRANSMITTING COMPONENT

(71) Applicant: American Axle & Manufacturing, Inc., Detroit, MI (US)

(72) Inventors: Douglas J. Chemelli, Royal Oak, MI (US); Steven C. Smith, Clinton Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 13/750,130

(22) Filed: Jan. 25, 2013

(51) Int. Cl.
*F16H 48/06* (2006.01)

(52) U.S. Cl.
USPC .......................................... 475/230

(58) Field of Classification Search
USPC .................................. 475/230, 336
See application file for complete search history.

(56) References Cited

U.S. PATENT DOCUMENTS

| | | | |
|---|---|---|---|
| 3,901,103 A | 8/1975 | Hufstader | |
| 4,261,219 A | 4/1981 | Suzuki et al. | |
| 4,583,424 A | 4/1986 | von Hiddessen et al. | |
| 4,597,311 A | 7/1986 | Takeda | |
| 4,625,584 A | 12/1986 | Onodera | |
| 4,703,671 A | 11/1987 | Jikihara | |
| 4,793,211 A | 12/1988 | Schmidt | |
| 4,821,602 A | 4/1989 | Yasui et al. | |
| 4,914,800 A | 4/1990 | Cook | |
| 5,620,388 A * | 4/1997 | Schlegelmann et al. | 475/230 |
| 6,398,689 B1 | 6/2002 | Morse et al. | |
| 6,497,027 B1 * | 12/2002 | Irwin | 29/407.01 |
| 6,618,924 B1 * | 9/2003 | Irwin | 29/407.05 |
| 6,692,398 B1 | 2/2004 | Sullivan | |
| 6,813,972 B2 | 11/2004 | Guo | |
| 7,022,041 B2 | 4/2006 | Valente | |
| 7,108,428 B2 | 9/2006 | Ason et al. | |
| 7,147,585 B2 | 12/2006 | Valente | |
| 7,175,560 B2 | 2/2007 | Petruska et al. | |
| 7,232,399 B2 | 6/2007 | Valente | |
| 7,282,006 B2 | 10/2007 | Petruska et al. | |
| 7,585,032 B2 | 9/2009 | Seeds et al. | |
| 7,611,437 B2 | 11/2009 | Valente | |
| 7,744,500 B2 | 6/2010 | Donofrio et al. | |
| 7,775,928 B2 | 8/2010 | Zink | |
| 7,837,588 B2 | 11/2010 | Valente | |
| 7,931,557 B2 | 4/2011 | Zink | |
| 7,998,012 B2 | 8/2011 | Zink | |
| 8,167,762 B2 | 5/2012 | Zink et al. | |
| 8,177,014 B2 | 5/2012 | Platt et al. | |

* cited by examiner

*Primary Examiner* — Edwin A Young
(74) *Attorney, Agent, or Firm* — Harness, Dickey & Pierce, P.L.C.

(57) ABSTRACT

A power transmitting component that includes a housing, a differential case, a ring gear coupled to the differential case for rotation therewith, a pinion gear meshed with the ring gear, a bearing mount, a differential bearing and a retaining ring. The housing has a bearing mounting aperture and a retaining ring groove. The bearing mount is received in the bearing mounting aperture. The differential bearing disposed is between the differential case and the bearing mount. The retaining ring is received into the retaining ring groove and is sized in thickness a) to control a pattern of mesh between the ring gear and the pinion gear, b) to maintain a predetermined preload on the differential bearings, or c) to control the pattern of mesh between the ring gear and the pinion gear, and to maintain the predetermined preload on the differential bearings.

22 Claims, 4 Drawing Sheets

US 8,460,149 B1

DIFFERENTIAL BEARING SYSTEM FOR A POWER TRANSMITTING COMPONENT AND METHOD FOR ASSEMBLING A POWER TRANSMITTING COMPONENT

FIELD

The present disclosure relates to a differential bearing system for a power transmitting component and a related method for assembling a power transmitting component.

BACKGROUND

This section provides background information related to the present disclosure which is not necessarily prior art.

Various power transmitting components, such as axle assemblies, may include differential bearings that rotationally support a differential assembly in a housing. Side-to-side positioning of the differential assembly relative to the housing may be undertaken to obtain desired meshing of the ring and pinion gears. Additionally, the differential bearings are typically preloaded. Accordingly, there remains a need in the art for a power transmitting component having a configuration that permits side-to-side positioning of the differential assembly and/or preloading of the differential bearings in a well-controlled manner.

SUMMARY

This section provides a general summary of the disclosure, and is not a comprehensive disclosure of its full scope or all of its features.

In one form, the present disclosure provides a power transmitting component that includes a housing, a differential case, a ring gear, a pinion gear, a bearing mount, a differential bearing and a retaining ring. The housing has a bearing mounting aperture and a retaining ring groove. The differential case is received in the housing. The ring gear is coupled to the differential case for common rotation. The pinion gear is mounted in the housing and is meshed to the ring gear. The bearing mount is received in the bearing mounting aperture. The differential bearing disposed is between the differential case and the bearing mount. The retaining ring is received into the retaining ring groove and is sized in thickness a) to control a pattern of mesh between the ring gear and the pinion gear, b) to maintain a predetermined preload on the differential bearings, or c) to control the pattern of mesh between the ring gear and the pinion gear, and to maintain the predetermined preload on the differential bearings.

In another form, the present disclosure provides a power transmitting component that includes a housing, a differential case, a ring gear, a pinion gear, a pair of bearing mounts, a pair of differential bearings and a pair of retaining rings. The housing has a pair of bearing mounting apertures and a pair of retaining ring grooves. The differential case is received in the carrier housing. The ring gear is coupled to the differential case for common rotation. The pinion gear is mounted in the housing and is meshed to the ring gear. Each of the bearing mounts is received in a corresponding one of the bearing mounting apertures such that the differential case is disposed between the bearing mounts. Each of the differential bearings is disposed between the differential case and a corresponding one of the bearing mounts. Each of the retaining rings is received into a corresponding one of the retaining ring grooves. The retaining rings are sized in thickness to control a pattern of mesh between the ring gear and the pinion gear and to maintain a predetermined preload on the differential bearings.

In still another form, the present disclosure provides a method for assembling a power transmitting component. The method includes: providing a housing with a bearing mounting aperture; assembling a pinion gear to the housing; providing a ring gear mounted to a differential case; positioning the differential case, a pair of differential bearings and a pair of bearing mounts in the housing such that the ring gear is meshed to the pinion gear; applying a predetermined axially compressive load through the differential case, the differential bearings and the bearing mounts; determining that the differential case is positioned in a desired manner axially along a rotational axis of the differential case such that the ring gear and the pinion gear mesh in a desired manner; sizing a thickness of each of a pair of retaining rings so that when the retaining rings are installed to the housing the retaining rings are configured to maintain relative positioning between the differential case and the housing such that the ring gear and the pinion gear are meshed in the desired manner and a predetermined minimum preload is maintained on the differential bearings; and inserting the retaining rings to a pair of ring grooves in the housing, each retaining ring abutting an outboard axial face of a corresponding one of the bearing mounts.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
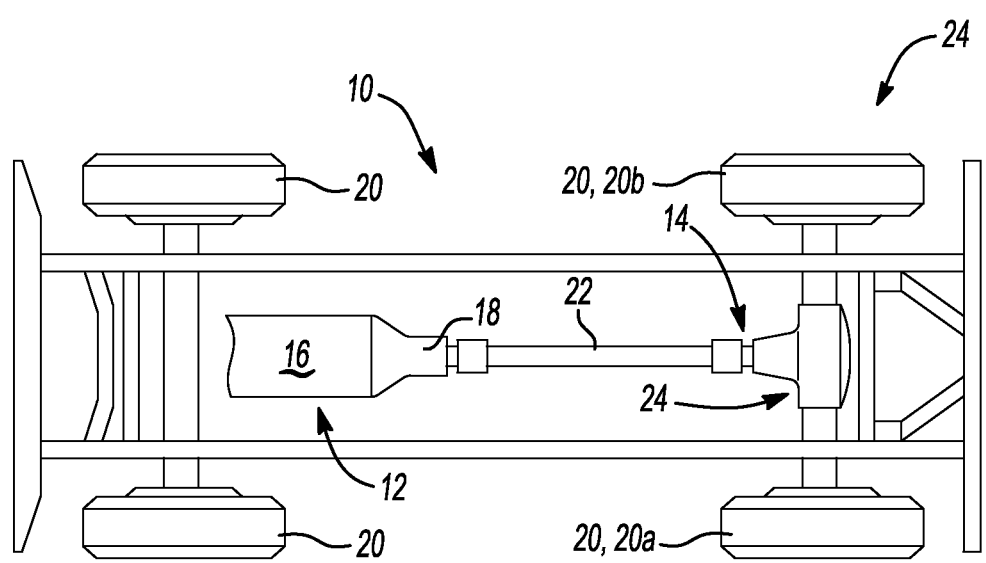
FIG. 1 is a schematic illustration of a vehicle having a power transmitting component (i.e., a rear axle assembly) constructed in accordance with the teachings of the present disclosure.

With reference to FIG. 1 of the drawings, an exemplary vehicle 10 is schematically illustrated as having a power transmitting component (i.e., a rear axle assembly 24 in the particular example provided) that is constructed in accordance with the teachings of the present disclosure. It will be appreciated, however, that the teachings of the present disclosure have application to other power transmitting components, such as power take-off units and transfer cases. As such, the particular example described herein and illustrated in the appended drawings will not be understood as limiting the scope of the disclosure in any way. The vehicle 10 can include a power train 12 and a drive train 14. The power train 12 can comprise any means for generating propulsive power, such as an internal combustion engine 16 and/or an electric motor (not shown), and a conventional transmission 18. The transmission 18 can receive rotary power from the propulsive power generating means (e.g., indirectly, through a conventional clutch and/or torque converter) and can perform a speed reduction/torque multiplication function before outputting the propulsive power to the drive train 14.

The drive train 14 can be configured in any desired manner to transmit propulsive power received from the transmission 18 to one or more sets of the vehicle wheels 20. In this regard, those of skill in the art will appreciate that the drive train 14 can have a two-wheel drive configuration or a type of four or all-wheel drive configuration (e.g., full-time four wheel drive, part-time four wheel drive). In the particular example provided, the drive train 14 has a rear-wheel drive configuration and includes a propshaft 22 and a rear axle assembly 24. Rotary power output from the transmission 18 can be received by the propshaft 22 and transmitted to the rear axle assembly 24, where it can be selectively apportioned in a predetermined manner to the left and right rear wheels 20a and 20b, respectively.

Figure 2:
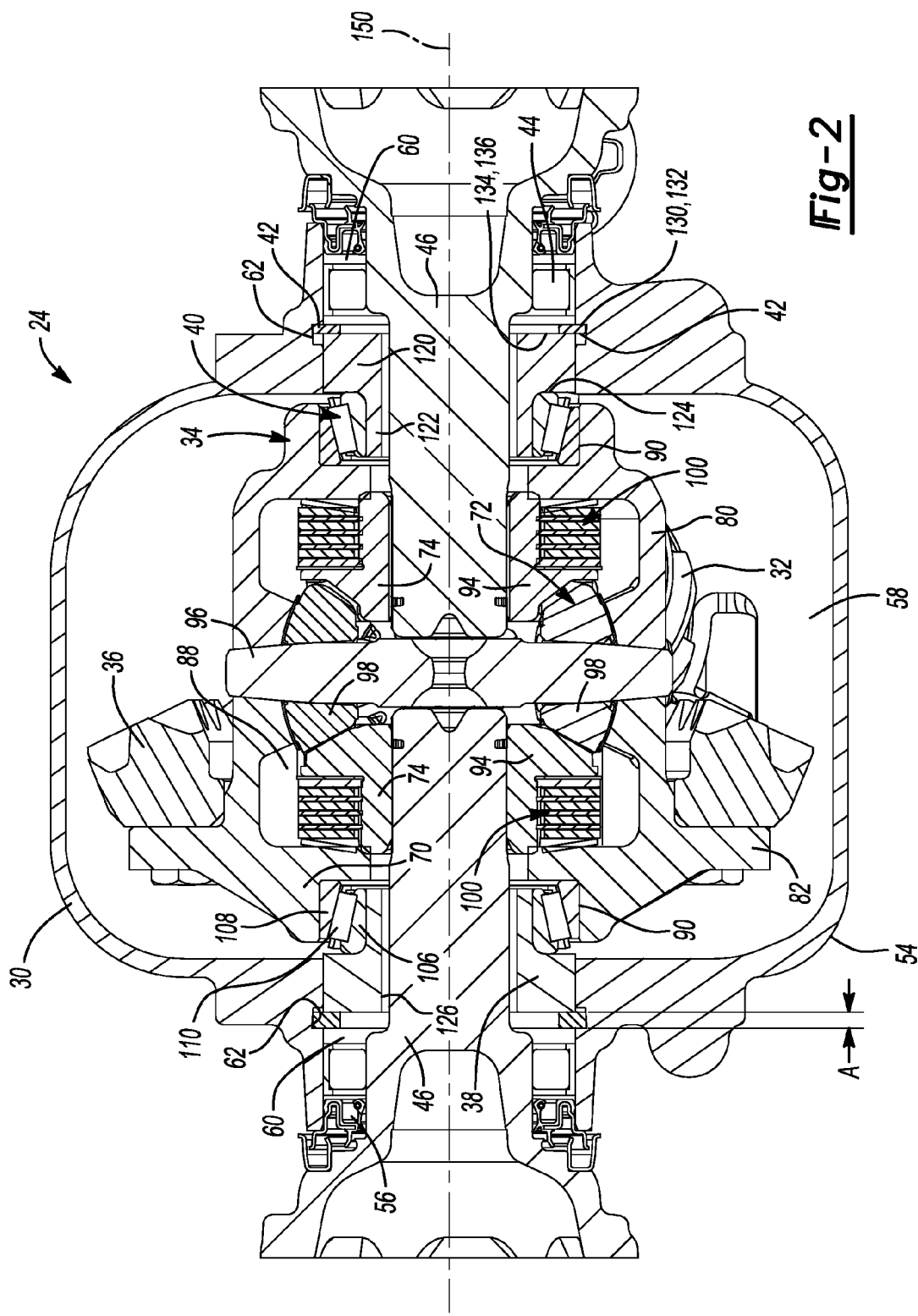
FIG. 2 is a partial section view of the rear axle assembly of FIG. 1 taken along a rotational axis of a differential assembly.

With reference to FIG. 2, the rear axle assembly 24 can comprise an axle housing assembly 30, an pinion gear 32, a differential assembly 34, a ring gear 36, a pair of bearing mounts 38, a pair of differential bearings 40, a pair of retaining rings 42, a pair of axle shaft or outboard bearings 44 and a pair of axle shafts 46.

The axle housing assembly 30 can include a carrier housing 54, a pair of axle shaft seals 56, and a cover (not shown). The carrier housing 54 can define a cavity 58, a pair of bearing mounting apertures 60 and a pair of retaining ring grooves 62. The cavity 58 can be sized to receive the differential assembly 34 therein. The bearing mounting apertures 60 can be disposed on opposite sides of the cavity 58. Each bearing mounting aperture 60 can extend through a side of the carrier housing 54 and can intersect the cavity 58. In the particular example provided, each bearing mounting aperture 60 is uniformly cylindrical over its length. It will be appreciated, however, that the bearing mounting apertures 60 could be configured differently (e.g., stepped in diameter). Each retaining ring groove 62 can be formed along the length of and concentric with a corresponding one of the bearing mounting apertures 60. Each axle shaft seal 56 can be received into an outboard end of a corresponding one of the bearing mounting apertures 60 and can be configured to sealingly engage the carrier housing 54 and an associated one of the axle shafts 46. The cover can be fixedly but removably coupled to the carrier housing 54 to close a side of the cavity 58.

The pinion gear 32 can be received in the carrier housing 54 and supported for rotation via one or more pinion bearings (not shown). The pinion gear 32 can receive rotary power from the propshaft 22 (FIG. 1).

The differential assembly 34 can comprise a differential case 70 and a power transmitting means or differential assembly 72 having a pair of output members 74. The differential case 70 can comprise an annular wall member 80 and a flange member 82 that can be fixed to the wall member 80. The annular wall member 80 can define a differential cavity 88 into which the power transmitting means 72 can be disposed. The annular wall member 80 can further define a pair of counterbores 90 formed in the opposite axial ends of the differential case 70. The power transmitting means 72 can comprise any means for transmitting rotary power from the differential case 70 to the output members 74 and may include a mechanism for providing speed/torque differentiation between the output members 74. In one form, the output members 74 could be fixed to the differential case 70 for common rotation so that speed and torque differentiation between the output members 74 is prohibited. In another form, the output members 74 could be associated with a mechanism that is capable of providing speed/torque differentiation between the output members 74. For example, the output members 74 could be portions of a clutch (e.g., friction clutch). In the particular example provided, the output members 74 are side gears 94 in a differential gearset that can comprise a cross pin 96, a pair of pinion gears 98 that are rotatably mounted on the cross pin 96, the side gears 94, which are meshed with the pinion gears 98, and two sets of friction plates 100. Each set of friction plates 100 has a set of interleaved plate members in which some of the plate members are coupled to the differential case 70 for rotation therewith and other plate members are coupled to an associated one of the side gears 94 for rotation therewith. As those of ordinary skill in the art will appreciate, the sets of friction plates 100, which are entirely optional, provide for limited slip capabilities in the power transmitting means 72.

The ring gear 36 can be fixedly coupled to the flange member 82 such that the differential case 54 and the ring gear 36 co-rotate. The ring gear 36 is meshingly engaged with the pinion gear 32.

The differential bearings 40 can be conventional bearings having an inner bearing race 106, an outer bearing race 108, and a plurality of bearing elements 110 (e.g. tapered rollers) disposed between the inner and outer bearing races 106 and 108. Each of the outer bearing races 108 can be received into an associated one of the counterbores 90 in the differential case 70 and abutted against the wall member 80.

Each of the bearing mounts 38 can comprise a body portion 120, a nose portion 122, and a shoulder wall 124 that is disposed axially between the body portion 120 and the nose portion 122. A shaft aperture 126 can be formed axially through each bearing mount 38 for receipt therethrough of an associated one of the axle shafts 46. The body portion 120 can be sized to tightly fit (e.g., slip fit, line-to-line fit, press-fit) in a corresponding one of the bearing mounting apertures 60 in the carrier housing 54. It will be appreciated that the fit between the body portion 120 and the corresponding bearing mount aperture 60 can be configured to permit axial sliding movement of the bearing mount 38 within the corresponding bearing mounting aperture 60 but to closely align a longitudinal centerline of the bearing mount 38 to the longitudinal axis of the bearing mounting apertures 60. The nose portion 122 can be smaller in diameter than the body portion 120 so that the bearing elements 110 and/or the inner bearing race 106 can be received through the bearing mounting apertures 60. The shoulder wall 124 can extend radially outwardly from the nose portion 122 and can abut the inner bearing race 106.

Each of the retaining rings 42 can be received into a corresponding one of the retaining ring grooves 62 in the carrier housing 54. Each retaining ring 42 can have an outboard axial face 130, which can be abutted against an outboard face 132 of a corresponding one of the ring grooves 62, and an inboard axial face 134, which can be abutted against an outboard axial face 136 of a corresponding one of the bearing mounts 38.

Each of the outboard bearings 44 can be received into a corresponding one of the bearing mounting apertures 60 can be positioned to support a corresponding one of the axle shafts 46 for rotation relative to the carrier housing 54. In the particular example provided, the outboard bearings 44 comprise needle bearings.

It will be appreciated that the differential case 70 is positioned within the carrier housing 54 (along the rotational axis 150 of the differential assembly 34) so that the ring gear 36 and the pinion gear 32 are appropriately meshed with one another. Due to manufacturing tolerances, it can be necessary to control the axial position of the differential case 70 along the rotational axis 150 to arrive at a desired meshing between the ring gear 36 and the pinion gear 32. As such, the axial spacing between the outboard axial face 132 of the ring groove and the outboard axial face 136 of the bearing mount 38 can vary from side to side, as well as between axle assemblies. Accordingly, each of the retaining rings 42 can be selected such that its thickness is specifically matched to the axial spacing between the outboard axial faces 132 and 136 in a given situation. Stated another way, each of the retaining rings 42 is select fit to the axial spacing A between a corresponding pair of outboard axial faces 132 and 136.

Figure 3:
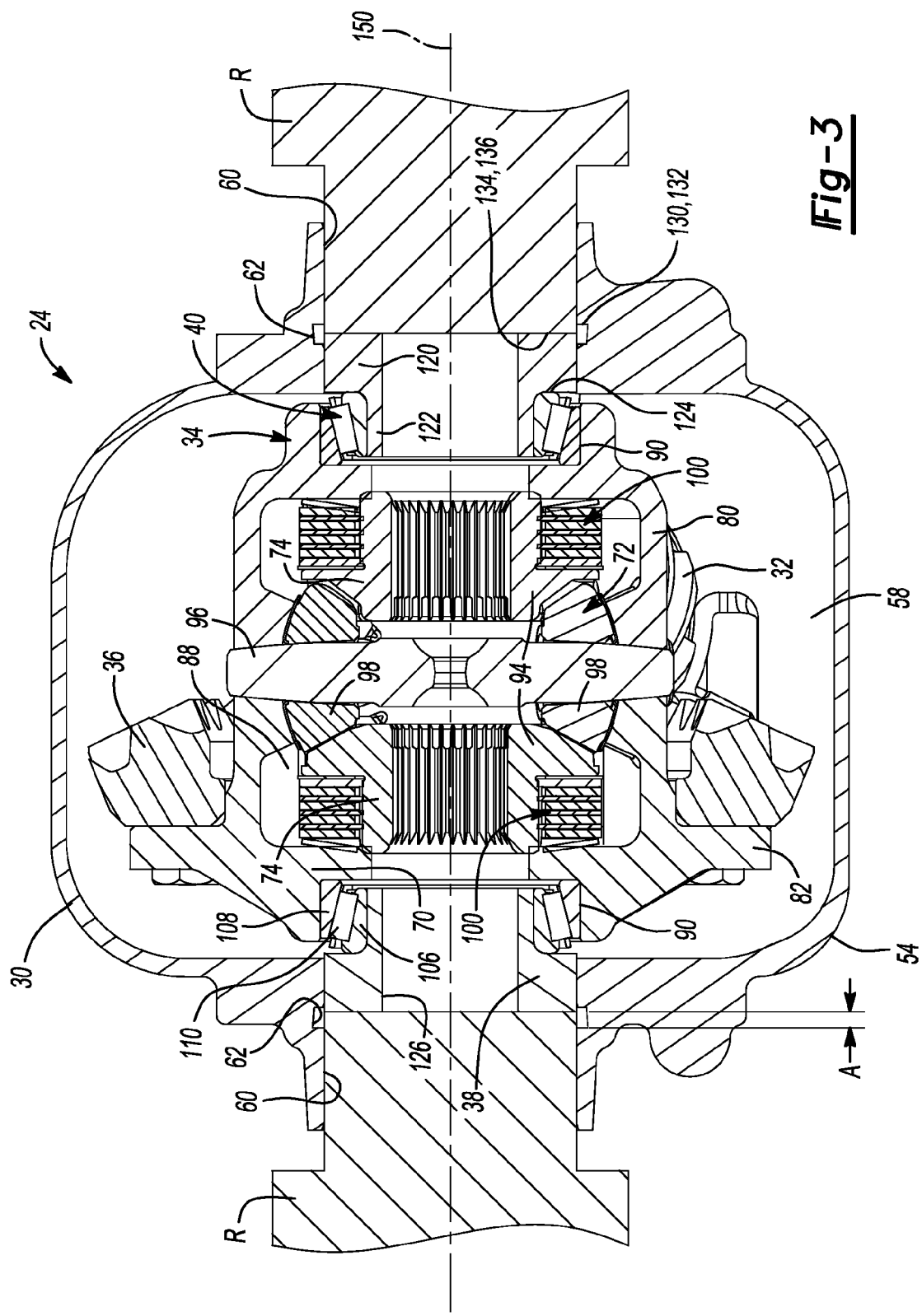
FIG. 3 is a section view of a portion of the rear axle assembly of FIG. 1, the rear axle assembly being disposed in an assembly machine having two rams that are employed to position the differential assembly.

With reference to FIGS. 2 and 3, one method for assembling the (rear) axle assembly 24 can comprise the use of a pair of rams R, which cooperate to apply a predetermined compressive force to the differential assembly 34, the differential bearings 40 and the bearing mounts 38, to move the differential assembly 34, the differential bearings 40 and the bearing mounts 38 axially along the rotational axis 150 such that the ring gear 36 and the pinion gear 32 are appropriately meshed. The axial spacing A between the outboard axial surfaces 132 and 136 on each axial side of the differential assembly 34 can be determined and the retaining rings 42 can be selected to match the determined axial spacings A. One method for determining the dimension of each axial spacing A could comprise measurement, for example via a probe or optically, of features on the carrier housing 54 and the bearing mounts 38 after the ring gear 36 has been meshed to the pinion gear 32. Another method for determining the dimension of each axial spacing A could comprise an analysis that is based upon a datum on the differential case 70 and its position along the rotational axis 150 after the ring gear 36 has been meshed to the pinion gear 32.

The differential assembly 34, the differential bearings 40 and the bearing mounts 38 can be moved (as a unit) axially along the rotational axis 150 in a first direction by an amount that permits a first one of the retaining rings to be received through a first one of the bearing mounting apertures 60 and into a first corresponding one of the ring grooves 62. It will be appreciated that the retaining rings 42 can be installed to the carrier housing 54 in any desired manner, such as manually with hand tools, or via automation that employs a machine that mimics manual installation via hand tools or which employs frusto-conically shaped tooling that permits the retaining ring 42 to be compressed radially as it is moved in an axial direction into a corresponding one of the bearing mounting apertures 60. The differential assembly 34 can be moved axially along the rotational axis 150 in an opposite direction such that the (installed) retaining ring 42 is abutted against the corresponding outboard axial surfaces 132 and 136.

A force can be applied to the carrier housing 54 to elastically distort the carrier housing 54 to permit the opposite retaining ring 42 to be received into the opposite retaining ring groove 62. Such techniques for temporarily distorting a carrier housing are known in the art and as such, a detailed discussion of such techniques need not be provided herein. Alternatively, an axial force can be applied to the opposite retaining ring 42 to move the opposite retaining ring 42 in the bearing mounting aperture 60 so that it can be received into the opposite ring groove 62. It will be appreciated that since the axial spacings A were measured when a predetermined axially compressive load or force was applied to the differential assembly 34, the differential bearings 40 and the bearing mounts 38, the use of correspondingly sized (i.e., thick) retaining rings 42 controls the meshing of the ring gear 36 and the pinion gear 32, as well as results in preloading the differential bearings in a similar (and thus known) manner. Stated another way, the retaining rings 42 can be selected based on their thickness to control a pattern of mesh between the ring gear 36 and the pinion gear 32 and/or to maintain a predetermined preload on the differential bearings 40.

Figure 4:
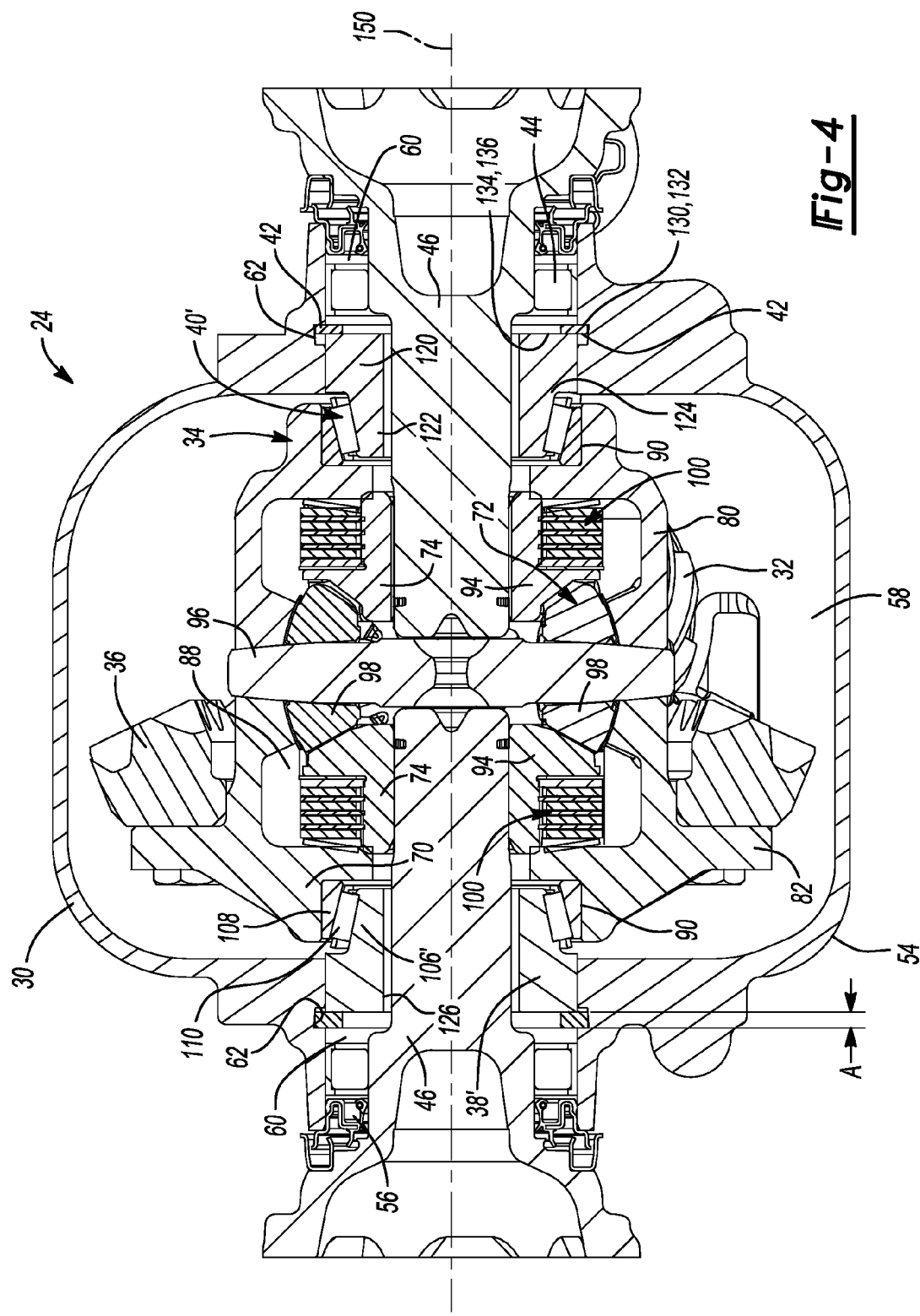
FIG. 4 is a view similar to that of FIG. 2, but illustrating another power transmitting component constructed in accordance with the teachings of the present disclosure.

Another power transmitting component constructed in accordance with the teachings of the present disclosure is shown in FIG. 4. The power transmitting component can be generally similar to that which is described above, except that the inner bearing race 106' of each differential bearing 40' can be unitarily and integrally formed with a corresponding one of the bearing mounts 38' (i.e., the inner bearing race 106' and the bearing mount 38' can be formed as a single component so that these components need not be assembled and cannot be disassembled).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting component comprising:
   a housing having a pair of bearing mounting apertures and a pair of retaining ring grooves;
   a differential case received in the housing;
   a ring gear coupled to the differential case for common rotation;
   a pinion gear mounted in the housing and meshed to the ring gear;
   a pair of bearing mounts, each of the bearing mounts being received in a corresponding one of the bearing mounting apertures such that the differential case is disposed between the bearing mounts;
   a pair of differential bearings, each of the differential bearings being disposed between the differential case and a corresponding one of the bearing mounts; and
   a pair of retaining rings, each retaining ring being received into a corresponding one of the retaining ring grooves, the retaining rings being sized in thickness to control a pattern of mesh between the ring gear and the pinion gear and to maintain a predetermined preload on the differential bearings.

2. The power transmitting component of claim 1, wherein a first one of the differential bearings has a first outer bearing race that is received into a first counterbore in the differential case.

3. The power transmitting component of claim 2, wherein a second one of the differential bearings has a second outer bearing race that is received into a second counterbore in the differential case.

4. The power transmitting component of claim 1, further comprising a differential gearset received in the differential case.

5. The power transmitting component of claim 4, wherein the differential gearset comprises a pair of side gears and a pair of pinion gears, each of the pinion gears being meshed with the pair of side gears.

6. The power transmitting component of claim 1, further comprising a pair of output members and a pair of axle shafts, wherein rotary power is transmitted through the differential case to drive the output members, and wherein each of the axle shafts is drivingly coupled to a corresponding one of the output members.

7. The power transmitting component of claim 6, further comprising a pair of axle shaft bearings, each of the axle shaft bearings being received into the housing to support a corresponding one of the axle shafts for rotation relative to the housing.

8. The power transmitting component of claim 7, wherein each of the axle shaft bearings is received into a corresponding one of the bearing mounting apertures.

9. The power transmitting component of claim 1, wherein the bearing mounts are slidably received into the bearing mounting apertures.

10. The power transmitting component of claim 9, wherein the bearing mounts are press-fit into the bearing mounting apertures.

11. The power transmitting component of claim 1, wherein each of the differential bearings has a plurality of bearing elements that are mounted on an inner bearing race that is unitarily and integrally formed with a corresponding one of the bearing mounts.

12. A power transmitting component comprising:
 a housing having a bearing mounting aperture and a retaining ring groove;
 a differential case received in the housing;
 a ring gear coupled to the differential case for common rotation;
 a pinion gear mounted in the housing and meshed to the ring gear;
 a bearing mount received in the bearing mounting aperture;
 a differential bearing disposed between the differential case and the bearing mount; and
 a retaining ring received into the retaining ring groove and sized in thickness a) to control a pattern of mesh between the ring gear and the pinion gear, b) to maintain a predetermined preload on the differential bearings, or c) to control the pattern of mesh between the ring gear and the pinion gear, and to maintain the predetermined preload on the differential bearings.

13. The power transmitting component of claim 12, wherein the differential bearing has an outer bearing race that is received into a counterbore in the differential case.

14. The power transmitting component of claim 12, further comprising a differential gearset received in the differential case.

15. The power transmitting component of claim 14, wherein the differential gearset comprises a pair of side gears and a pair of pinion gears, each of the pinion gears being meshed with the pair of side gears.

16. The power transmitting component of claim 12, further comprising a pair of output members and a pair of axle shafts, the output members being driven at least partly by the differential case, each of the axle shafts being drivingly coupled to a corresponding one of the output members.

17. The power transmitting component of claim 16, further comprising an axle shaft bearing received into the housing to support a corresponding one of the axle shafts for rotation relative to the housing.

18. The power transmitting component of claim 17, wherein the axle shaft bearing is received into the bearing mount apertures.

19. The power transmitting component of claim 12, wherein the bearing mount is slidably received into the bearing mounting aperture.

20. The power transmitting component of claim 19, wherein the bearing mounts are press-fit into the bearing mounting apertures.

21. The power transmitting component of claim 12, wherein each of the differential bearings has a plurality of bearing elements that are mounted on an inner bearing race that is unitarily and integrally formed with a corresponding one of the bearing mounts.

22. A method for assembling a power transmitting component, the method comprising:
 providing a housing with a bearing mounting aperture;
 assembling a pinion gear to the housing;
 providing a ring gear mounted to a differential case;
 positioning the differential case, a pair of differential bearings and a pair of bearing mounts in the housing such that the ring gear is meshed to the pinion gear;
 applying a predetermined axially compressive load through the differential case, the differential bearings and the bearing mounts;
 determining that the differential case is positioned in a desired manner axially along a rotational axis of the differential case such that the ring gear and the pinion gear mesh in a desired manner;
 sizing a thickness of each of a pair of retaining rings so that when the retaining rings are installed to the housing the retaining rings are configured to maintain relative positioning between the differential case and the housing such that the ring gear and the pinion gear are meshed in the desired manner and/or a predetermined minimum preload is maintained on the differential bearings; and
 inserting the retaining rings to a pair of ring grooves in the housing, each retaining ring abutting an outboard axial face of a corresponding one of the bearing mounts.

* * * * *